United States Patent
Moubarak et al.

(10) Patent No.: US 12,513,243 B2
(45) Date of Patent: Dec. 30, 2025

(54) CONDITIONAL ALERTING IN EMERGENCY CALLS

(71) Applicant: MOTOROLA SOLUTIONS, INC., Chicago, IL (US)

(72) Inventors: Michel Moubarak, Chelsea (CA); Pawel Jurzak, Cracow (PL); Jacqueline Mazzeo, New York, NY (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 168 days.

(21) Appl. No.: 18/520,157

(22) Filed: Nov. 27, 2023

(65) Prior Publication Data

US 2025/0175557 A1    May 29, 2025

(51) Int. Cl.
| | |
|---|---|
| H04M 11/04 | (2006.01) |
| G10L 17/00 | (2013.01) |
| H04L 67/306 | (2022.01) |
| H04M 3/51 | (2006.01) |

(52) U.S. Cl.
CPC .......... *H04M 3/5116* (2013.01); *G10L 17/00* (2013.01); *H04L 67/306* (2013.01)

(58) Field of Classification Search
CPC .......... H04M 3/5116; H04M 3/42348; H04M 3/563; G10L 17/00; H04L 67/306; H04L 65/1016
USPC ........................................................ 379/45
See application file for complete search history.

(56) References Cited

U.S. PATENT DOCUMENTS

| | | |
|---|---|---|
| 8,516,122 B2 | 8/2013 | Piett et al. |
| 2007/0055684 A1 | 3/2007 | Stevens |
| 2008/0013708 A1* | 1/2008 | Brown .................. H04M 3/563 |
| | | 379/202.01 |
| 2009/0136006 A1 | 5/2009 | Milton et al. |
| 2012/0173582 A1 | 7/2012 | Stevens |
| 2021/0383918 A1 | 12/2021 | Martin et al. |
| 2022/0030109 A1 | 1/2022 | Leavitt et al. |

FOREIGN PATENT DOCUMENTS

WO    WO-2008083595 A1 *    7/2008    ......... H04L 65/1046

OTHER PUBLICATIONS

International Search Report and Written Opinion for Application No. PCT/US2024/053345 dated Feb. 19, 2025 (14 pages).

* cited by examiner

*Primary Examiner* — Md S Elahee
(74) *Attorney, Agent, or Firm* — Michael Best & Friedrich LLP

(57) ABSTRACT

Examples provide an emergency call center server including an electronic processor configured to determine that an emergency service provider has received a call from a caller regarding an incident, identify the caller based on the received call, and access a user profile associated with the caller from a database. The user profile includes a set of user data associated with the caller and a set of contextual trigger conditions defining types and/or locations of incidents. Based on the received call, the electronic processor determines satisfied ones of the set of contextual trigger conditions, selectively releases, to the emergency service provider, a first subset of user data that is associated with one or more satisfied contextual trigger conditions, and prevents release of a second subset of user data that is associated with one or more unsatisfied contextual trigger conditions.

20 Claims, 6 Drawing Sheets

CONDITIONAL ALERTING IN EMERGENCY CALLS

BACKGROUND

Call takers at public safety answering points (PSAPs), or 911 emergency call centers (sometimes designated in other countries as 112, 999, and the like) collect contextual information from callers regarding emergency incidents, such as location, type of incident, and other details that can assist first responders in responding quickly to incidents.

Figure 1:
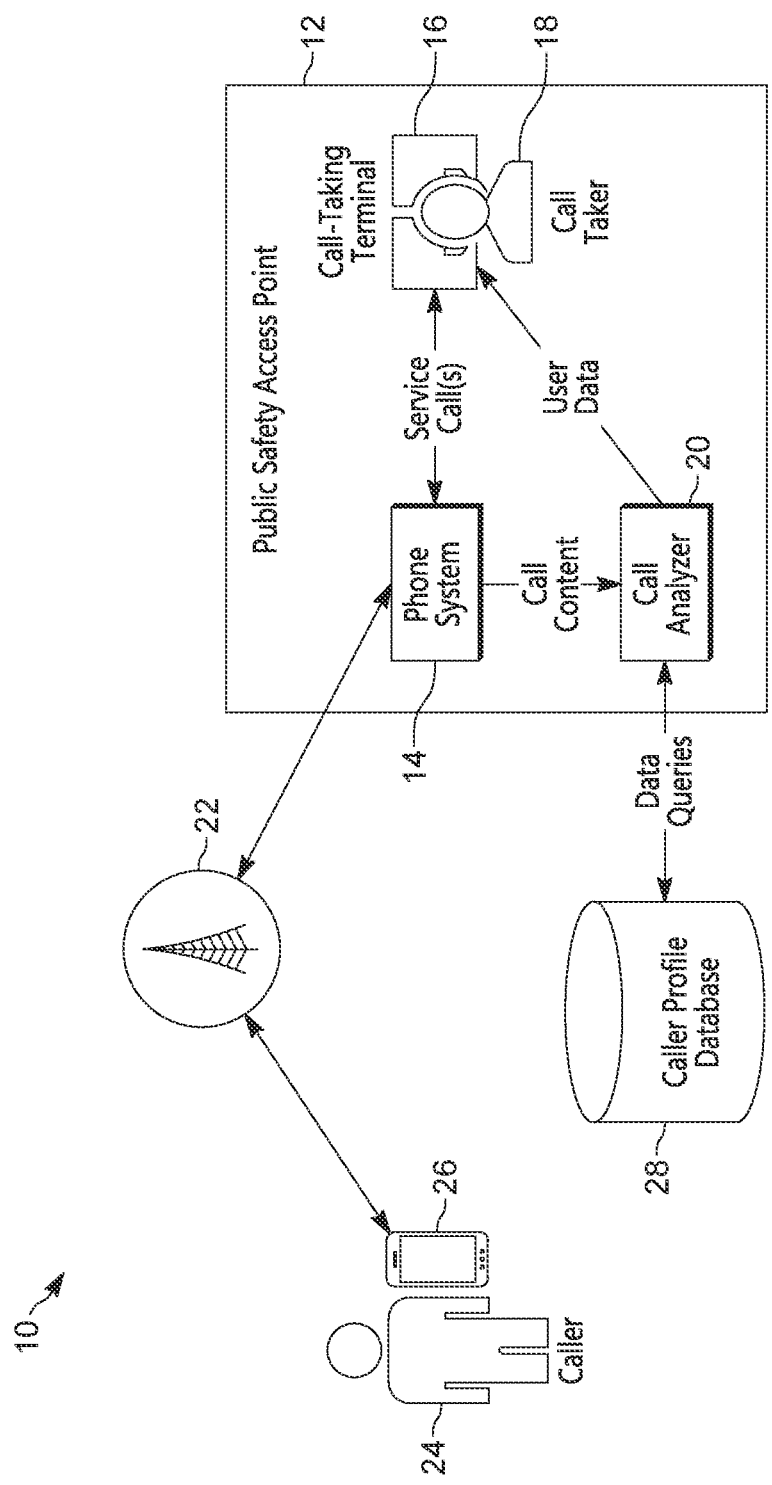
FIG. 1 illustrates a public safety communication system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Call handlers at public safety answering points (PSAPs) that receive emergency calls prompt questions to the caller to gain a contextual understanding of an incident so that first responders can respond accurately and efficiently to the incident. In some instances, acquiring sufficient information and accurate information from a caller can be a time consuming process during an emergency. Call takers may not know what information to ask for, and, depending on the emergency, callers may have trouble responding to questions and recalling information. In addition to contextual information relating to an incident (e.g., medical conditions of the caller, medications of the caller, type of incident, etc.), first responders may require instructions on how to access the caller's exact location, such as, for example, building access codes or the like. Further, callers may want certain individuals (e.g., emergency contacts, neighbors, employers, building receptionists, etc.) to be notified of the emergency incident.

Before an incident occurs, a caller may create a user profile containing personal information such as medical conditions, medications, health data, emergency contacts, and the like that is stored in a database accessible by call takers at a PSAP. However, depending on the context of an emergency incident, not all of the information stored in the user profile may be useful to the call taker to determine how to respond to the incident. For example, when a caller calls about a non-medical related incident, it is not necessary that the call taker have access to the caller's medical information. As another example, a caller may be calling to report an incident affecting a third party, rather than the caller (e.g., a medical emergency affecting someone else). In such instances, providing the caller's medical information to a call taker may distract or otherwise mislead the call taker.

Thus, there is a need for enabling better situational awareness to PSAP call takers while maintaining a caller's privacy by leveraging only the personal information of a caller that is contextually related to an emergency incident. One example provides an emergency call center server including: an electronic processor and a non-transitory computer-readable medium storing program instructions that, when executed by the electronic processor, cause the emergency call center server to perform a set of operations including: determining that an emergency service provider has received a call from a caller regarding an incident; determining whether the received call is a voice-based or a text-based call; when the received call is a voice-based call, performing speech recognition on the received call; identifying the caller based on the received call; accessing, from a user profile database storing a plurality of user profiles each associated with respective users, a user profile associated with the caller, the user profile including a set of user data associated with the caller and a set of contextual trigger conditions defining types and/or locations of incidents; based on the received call, determining satisfied ones of the set of contextual trigger conditions; selectively releasing, to the emergency service provider, a first subset of user data that is associated with one or more satisfied contextual trigger conditions; and preventing release of a second subset of user data that is associated with one or more unsatisfied contextual trigger conditions.

In some aspects, the user profile further includes a set of user-defined emergency contacts, each emergency contact associated with one or more contextual trigger conditions, and the electronic processor is further configured to: selectively notify a subset of emergency contacts of the incident based on the satisfied ones of the set of contextual trigger conditions.

In some aspects, the user data includes a set of travel plans defining a travel destination, a location of the incident is associated with the travel destination, and the subset of emergency contacts includes one or more travel companions of the caller.

In some aspects, the user data includes a set of travel plans defining a travel time period, a time of the incident is within the travel time period, and the subset of emergency contacts includes one or more travel companions of the caller.

In some aspects, the set of emergency contacts includes at least one selected form the group consisting of a primary care provider of the caller, a building receptionist of a residence of the caller, a building receptionist of a workplace of the caller, a family member of the caller, and a friend of the caller.

In some aspects, the set of contextual trigger conditions include verbal consent of the caller, and the electronic processor is further configured to selectively notify the subset of emergency contacts of the incident in response to determining, based on the received call, that the caller has given verbal consent for the subset of emergency contacts to be notified of the incident.

In some aspects, to the set of operations further include conferencing an emergency contact included in the subset of emergency contacts into the call.

In some aspects, types of incidents defined by the set of contextual trigger conditions include at least one selected from the group consisting of all emergency incidents, a health-related incident, an injury, an allergic reaction, a mental health crisis.

In some aspects, locations of incidents defined by the set of contextual trigger conditions include at least one selected from the group consisting of a workplace of the caller, a residence of the caller, a frequented location of the caller predefined by the user profile associated with the caller, and a travel destination of the caller.

In some aspects, the set of user data includes at least one selected from the group consisting of information about allergies, information about medical conditions, information about medications, information about blood sugar levels, home address, a building access code, information about living arrangements of the caller, and information about dependents of the caller.

In some aspects, the set of operations further include: for each respective satisfied trigger condition, releasing a first respective subset of the user data that is associated with the respective satisfied trigger condition, and preventing release of a second respective subset of user data that is associated with unsatisfied ones of the set of contextual trigger conditions.

In some aspects, accessing the user profile associated with the caller is performed in response to determining that the user profile database includes a user profile associated with the caller.

In some aspects, the set of operations further include: determine, based on the received call, whether the incident involves the caller or a third party; and access the user profile associated with the caller in response to determining that the incident involves the caller.

In some aspects, the set of contextual trigger conditions are user-defined by the caller during a configuration procedure of the user profile associated with the caller.

In some aspects, selectively releasing the first subset of user data that is associated with one or more satisfied contextual trigger conditions causes the first subset of user data to be displayed on a user interface of the emergency service provider.

In some aspects, determining satisfied ones of the set of contextual trigger conditions is performed using a natural language model.

Another example provides a method for an emergency call center server, the method including: determining that an emergency service provider has received a call from a caller regarding an incident; determining whether the received call is a voice-based or a text-based call; when the received call is a voice-based call, performing speech recognition on the received call; identifying the caller based on the received call; accessing, from a user profile database storing a plurality of user profiles each associated with respective users, a user profile associated with the caller, the user profile including a set of user data associated with the caller and a set of contextual trigger conditions defining types and/or locations of incidents; based on the received call, determining satisfied ones of the set of contextual trigger conditions; selectively releasing, to the emergency service provider, a first subset of user data that is associated with one or more satisfied contextual trigger conditions, and preventing release of a second subset of user data that is associated with one or more unsatisfied contextual trigger conditions.

In some aspects, the user profile further includes a set of user-defined emergency contacts, each emergency contact associated with one or more contextual trigger conditions, and the method further includes: selectively notifying a subset of emergency contacts of the incident based on the satisfied ones of the set of contextual trigger conditions.

In some aspects, the user data includes a set of travel plans defining a travel destination, a location of the incident is associated with the travel destination, and the subset of emergency contacts includes one or more travel companions of the caller.

In some aspects, the user data includes a set of travel plans defining a travel time period, a time of the incident is within the travel time period, and the subset of emergency contacts includes one or more travel companions of the caller.

Examples are herein described with reference to flowchart illustrations and/or block diagrams of methods, apparatus (systems) and computer program products according to examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

Further advantages and features consistent with this disclosure will be set forth in the following detailed description, with reference to the figures.

Referring now to the drawings, FIG. 1 illustrates an example public safety communications system 10. It should be understood that the system 10 is provided as one example and, in some instances, the system 10 may include fewer or additional components than those illustrated. As would be understood by one skilled in the art, FIG. 1 is a simplified diagram. Networks are more complex than the schematic elements depicted in FIG. 1.

In the illustrated example, the system 10 includes PSAP 12 (for example, an emergency call center) having a phone system 14, a call-taking terminal 16, a call taker 18 associated with the call-taking terminal 16, and a call analyzer device 20. While illustrated for simplicity as including a single call-taking terminal 16 and call taker 18, it should be understood that the PSAP 12 may include multiple call-taking terminals 16 and multiple call takers 18. Additionally, while illustrated for simplicity as a single call analyzer device 20 residing at the PSAP 12, the call analyzer device 20 may alternatively be implemented in a distributed manner at the PSAP 12. In some instances, the call analyzer device 20 is implemented in whole or in part by a cloud computing environment accessible by the PSAP 12.

The PSAP 12 is communicatively connected to a communication network 22 and performs, among other things, computer aided dispatch (CAD) operations to provide emergency services to callers, such as the caller 24 illustrated in FIG. 1. The call-taking terminal 16 includes, among other things, a processor (for example, a microprocessor or another suitable programmable device), a memory (i.e., a computer-readable storage medium), and one or more input devices, output devices, or input and output devices including, for example, one or more displays, keyboards, keypads, mice, joysticks, touchscreens, speakers, microphones, and headsets.

The components of the PSAP 12 are communicatively coupled using one or more wired and/or wireless networks. A call taker 18 interacts with the call-taking terminal 16 to answer communications, including calls made to 911, received at the PSAP 12. For example, a caller 24, using a communication device 26 (for example, a telephone, a smart telephone, a tablet computer, or another similar device capable of operating as described herein) places a call to 911 using the communication network 22 (for example, a cellular network, the public switched telephone network, the Internet, or another suitable network), and the call is routed to the PSAP 12.

The phone system 14 routes calls received from callers, such as the caller 24, over the communication network 22 to the call-taking terminal 16 so that the call taker 18 may respond to the call. The call may be a voice-based call (e.g., a telephone call, a video call including audio, an audio recording sent via text-to-911, etc.) or a text-based call (e.g., a multimedia messaging service ("MMS") message, a short message service ("SMS") message, a real-time text ("RTT") message, etc.).

In addition to routing the call to the tall taker via the call-taking terminal 16, the phone system 14 provides call content and other information associated with the call (e.g., a phone number of the caller 24, a caller ID of the caller 24, a location of the caller 24, and/or the like) to the call analyzer device 20. The call analyzer device 20 is configured to analyze the call content by, for example, performing speech recognition with respect to the call content (e.g., using a natural language model or the like). Based on the call, the call analyzer device 20 accesses a caller profile database 28 storing user profiles associated with registered users. The call analyzer bot 44 may be implemented using, for example, one or more artificial intelligence ("AI") models. The memory 36 may also store user profile configuration information 46 for providing a user interface to the caller 24 and/or other users of the system 10 to implement user profile configuration procedure prior to placement of a 911 call by the caller 24 and/or other users of the system 10. In some instances, the user profile configuration information 46 is stored in a memory separate from the call analyzer bot 44. For example, a first server or computing device may provide call analysis and call analyzer bot functionality, and a second server or computing device may provide a user interface for enabling a user to configure a user profile.

The caller profile database 28 may be a database housed on a suitable database server communicatively coupled to and accessible by the call analyzer device 20. In some examples, the database 28 may be part of a cloud-based database system (for example, a data warehouse) external to the system 10 and accessible by components of the system 10 over one or more wired or wireless networks. In other configurations, all or part of the database 28 may be locally stored at the PSAP 12. The caller profiles stored in the database 28, described in greater detail below with respect to FIG. 3, contain emergency information associated with respective registered users that may aid a call taker of a PSAP (e.g., the call taker 18), a dispatcher of the PSAP 12, and/or a first responder dispatched by the PSAP 12 in responding to the emergency incident in regards to which the caller 24 is calling.

The database 28, responsive to receiving a request, or query, from the call analyzer device 20, provides the contents of a particular user profile (e.g., the user profile associated with the caller 24) or a subset of the contents of the particular user profile to the call analyzer device 20. For example, in response to the caller 24 contacting the PSAP 12, the call analyzer device 20 may identify the caller 24 according to a phone number of the caller 24, a caller ID of the caller 24, and/or a name or other identification of the caller 24 (e.g., as indicated by the caller during the call). Based on the determined identification of the caller 24 (e.g., the caller's phone number), the call analyzer device 20 performs a lookup in the database 28 to access the user profile associated with the caller 24.

Figure 2:
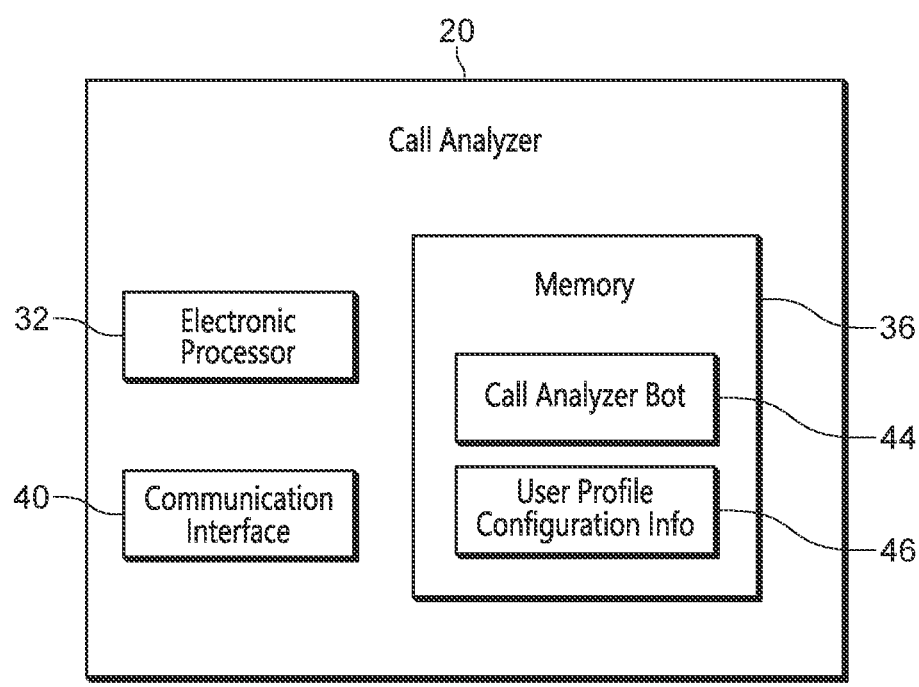
FIG. 2 illustrates a call analyzer device, according to some examples.

FIG. 2 schematically illustrates one example of the call analyzer device 20. In the example illustrated, the call analyzer device 20 includes an electronic processor 32 communicatively connected to a memory 36 and a communication interface 40. In some instances, the call analyzer device 20 is a computer server located on-premise of or remote from the PSAP 12. For example, some or all functionality of the call analyzer device 20 may be cloud implemented and accessible by the PSAP 12.

The electronic processor 32 includes suitable processing circuitry for performing the methods described herein or any combination of suitable processing circuitry. For example, the electronic processor 32 may include a digital signal processor (DSP), a graphics processing unit (GPU) embedded processor, a vision processing unit, etc. One or more circuit units included in the electronic processor 32 may operate independently or in parallel with one another.

The memory 36 may include read only memory (ROM), random access memory (RAM), other non-transitory computer-readable media, or a combination thereof. In the example shown, the memory 36 stores data and computer program instructions for performing, among other things, the methods described herein. For example, the memory 36 stores program data associated with a call analyzer bot 44 for performing speech recognition or otherwise generating transcripts of calls received by the PSAP 12 (e.g., using a natural language model or the like) and analyzing the content of the emergency calls. The communication interface 40 sends and receives communications to and from the call analyzer device 20 and other components of the system 10 (e.g., the database 28, the phone system 14, the call-taking terminal 16, and/or the like).

Figure 3:
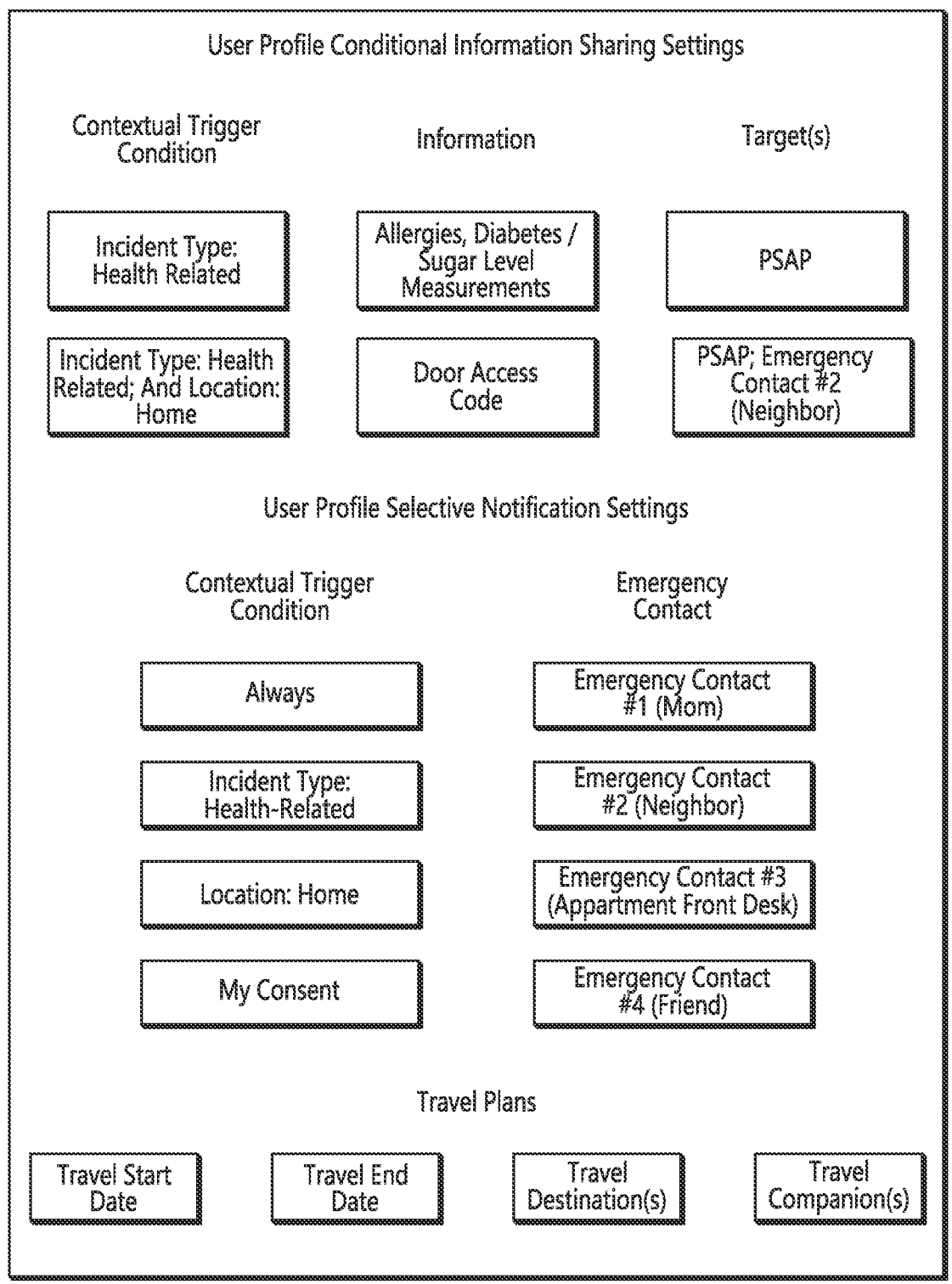
FIG. 3 illustrates a user profile, according to some examples.

Referring now to FIG. 3, an example configured user profile 48 is illustrated. The user profile 48 includes a set of user data associated with a respective registered user (e.g., the caller 24) and a set of contextual trigger conditions defining types, locations, and/or other conditions of emergency incidents that, when satisfied (e.g., based on a determination by the call analyzer device 20 when analyzing call content), trigger the release of subsets of the user data to the PSAP 12 (e.g., to a user interface of the call-taking terminal 16).

Types of incidents defined by the set of contextual trigger conditions may include all emergency incidents (i.e., any time the caller 24 calls an emergency service provider), a health-related incident (i.e., any health related incident), an injury, an allergic reaction, a mental health crisis, other specific types of health-related incidents, and/or the like. Locations of incidents defined by the set of contextual trigger conditions may include, for example, a workplace of the caller, a residence of the caller 24, a frequented location of the caller 24 predefined by the user profile 48, a travel destination of the caller 24, and/or the like. In some instances, the contextual trigger conditions include express permission or consent (e.g., verbal consent, text-based consent, visual consent, etc.) from the caller 24 to release user data. The contextual trigger conditions may be user-configurable through a user interface provided to the user by a server (e.g., the call analyzer device 20 or another server in the system 10 for managing user profiles).

The set of user data contained in the user profile 48, one or more subsets of which the call analyzer device 20 may release to the PSAP 12 upon satisfaction of a corresponding contextual trigger condition, may include, for example, information about allergies, information about medical conditions, information about medications, information about blood sugar levels, home address, a building access code, information about living arrangements of the caller (e.g., roommates, assisted living, transitional housing, etc.), information about dependents of the caller 24 (e.g., an indication that the caller 24 has a child or other dependent), and/or the like.

The user profile 48 may also include a set of user-defined emergency contacts, each emergency contact associated with one or more contextual trigger conditions. In addition to or in lieu of the PSAP 12, the call analyzer device 20 may release a subset of user data to a subset of emergency contacts when the call analyzer device 20 determines that the call satisfies one or more corresponding conditional trigger conditions. Alternatively or in addition, the call analyzer device 20 may selectively notify a subset of the emergency contacts of the emergency incident when one or more corresponding conditional trigger conditions are satisfied. For example, the set of emergency contacts may include a primary care provider of the caller 24, a building receptionist of a residence of the caller 24, a building receptionist of a workplace of the caller 24, a family member of the caller 24, a friend of the caller 24, and/or the like.

In the example illustrated in FIG. 3, the user profile 48 includes a first subset of user data including information about allergies, diabetes, and blood-sugar level measurements of the caller 24 that the call analyzer device 20 releases to the PSAP 12 when the call analyzer device 20 determines, based on the call content, that an incident is health-related. The user profile 48 also includes a second subset of user data including a door access code that the call analyzer device 20 releases to the PSAP 12 and to a designated emergency contact, such as a neighbor, when the call analyzer device 20 determines that the incident is health-related and the location of the incident is the caller's home. The call analyzer device 20 may determine the location of the incident based on location data associated with the call and/or an indication by the caller 24 of the caller's location.

The call analyzer device 20 may release a subset of user data (e.g., the door access code) to a designated emergency contact (e.g., the neighbor) by, for example, providing instructions to the call taker 18 (e.g., through the call-taking terminal 16) or to another user of the PSAP 12 on how to contact the emergency contact (e.g., by providing a name and phone number to a user interface of the PSAP 12), by transmitting an automated message to the emergency contact (e.g., an automated phone call, a text message, an email, an application notification, etc.), and/or by another communication means.

As described above, the call analyzer device 20 may selectively notify (e.g., via text message, phone call, an application notification, and/or the like) a subset of the emergency contacts of the emergency incident when one or more corresponding conditional trigger conditions are satisfied. In the example illustrated in FIG. 3, the call analyzer device 20 provides a notification to a first designated emergency contact (e.g., the caller's mother) every time the call analyzer device 20 determines that the caller 24 calls an emergency service provider. The call analyzer device 20 provides a notification to a second emergency contact (e.g., the caller's neighbor) when the call analyzer device 20 determines that the incident is health-related. The call analyzer device 20 provides a notification to a third emergency contact (e.g., a front-desk of the caller's apartment building) when the call analyzer device 20 determines that the location of the incident is the caller's home. The call analyzer device 20 provides a notification to a fourth emergency contact (e.g., a friend of the caller 24) when the call analyzer device 20 determines that the caller 24 has given consent (e.g., verbal consent to the call taker 18) for the fourth emergency contact to be notified. For example, the call analyzer device 20 may provide instructions to the call taker 18 through a user interface of the call-taking terminal 16 to ask the caller 24 for consent to notify the fourth emergency contact of the emergency incident.

In some instances, such as in the example illustrated in FIG. 3, the user data includes a set of travel plans defining one or more travel destinations, a travel start date, a travel end date, and a set of travel companions of the caller 24. In such instances, when the call analyzer device 20 determines that a location of the incident is associated with the travel destination and/or a time of the incident is within a travel time period (i.e., between the travel start date and travel end date), the call analyzer device 20 provides a notification to the set of travel companions.

In some instances, the set of contextual trigger conditions for notifying a subset of emergency contacts includes a recognized emotion or tone of voice of the caller 24. For example, the call analyzer device 20 may determine, based on the call content, that the caller 24 is in a state of panic, confusion, emotional distress, and/or the like. In response to determining that the emotion of the caller 24, the call analyzer device 20 may selectively notify a user-designated emergency contact of the incident.

In some instances, in response to providing a notification of the incident to an emergency contact of the caller 24, the call analyzer device 20 provides a notification to a user device associated with the caller 24 (e.g., the communication device 26) indicating that a notification of the incident has been transmitted to the emergency contact. Similarly, in some instances, in response to releasing a subset of user data to the PSAP 12 and/or an emergency contact, the call analyzer device 20 provides a notification to the user device associated with the caller 24 (e.g., the communication device 26) indicating that the subset of user data has been released to the PSAP 12 and/or the emergency contact. For example, the call analyzer device 20 may provide an automated message to the communication device 26 via text, via an application notification, or the like reciting "Door access code has been shared with Emergency Contact #2 (Neighbor) and PSAP."

In some instances, the call analyzer device 20 conferences an emergency contact included in the set of emergency contacts into the call between the caller 24 and the PSAP 12 when the call analyzer device 20 determines that a corresponding contextual trigger condition is satisfied. For example, the caller 24 may have trouble hearing, speaking, or otherwise communicating with the call taker 18, and the call analyzer device 20 therefore adds a designated emergency contact to the 911 call to assist in the communication between the call taker 18 and the caller 24.

Figure 4:
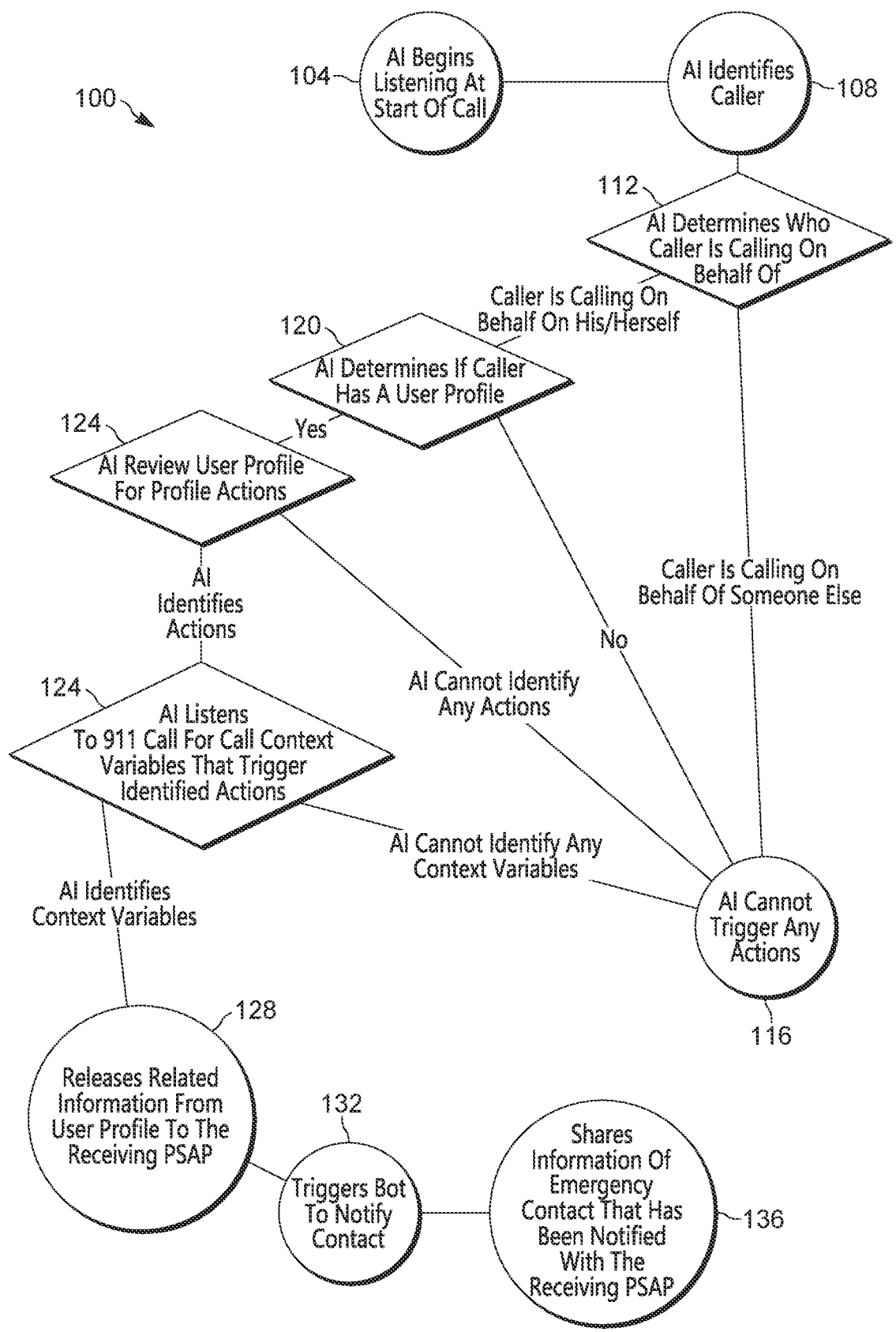
FIG. 4 illustrates a first method for conditional alerting in an emergency call, according to some examples.

FIG. 4 illustrates a first example method 100 implemented by the call analyzer device 20 (e.g., the electronic processor 32 of the call analyzer device 20) and performed in response to the PSAP 12 receiving a call from the caller 24 regarding an incident. At the start of the emergency call, the call analyzer device begins monitoring the call content (e.g., using one or more speech recognition methods on an audio-based call or analyzing a text-based call) (at block 104). The call analyzer device 20 identifies the caller 24, for example, based on a phone number of the caller 24 or the like as described above (at block 108). Based on the call content, the call analyzer device 20 determines whether the caller 24 is calling on behalf of his/herself or a third party (i.e., whether the incident involves the caller or a third party) (at block 112). For example, the caller 24 may be calling to report a traffic incident in which the caller 24 is not involved.

When the call analyzer device 20 determines that the caller is calling on behalf of someone else (i.e., a third party), the call analyzer device 20 ends the method 100 (at block 116). In other words, when the caller 24 is not involved in the incident, the call analyzer device may not attempt to access the user profile associated with the caller 24 because the caller's user data will not aid the call taker or first responders in responding to the incident. Additionally, providing the caller's user data, such as medical information, when the caller 24 is not involved in the indent may distract or mislead first responders.

When the call analyzer device 20 determines that the caller 24 is calling on behalf of his/herself, the call analyzer device determines whether the database 28 includes a user profile associated with the caller 24 (at block 120). For example, as described above, the call analyzer device 20 may perform a lookup in the database 28 based on a determined identification of the caller, such as a phone number or other identifier.

When the call analyzer device 20 determines that the database 28 does not include a user profile associated with the caller 24, the call analyzer device 20 ends the method 100 (at block 116). In contrast, when the call analyzer device 20 determines that the database 28 does include user profile associated with the caller 24, the call analyzer device 20 accesses the user profile associated with the caller 24 and determines a set of user data defined by the user profile, a set of actions, and corresponding contextual trigger conditions for performing the set of actions. The set of actions include, for example, releasing a subset of user data to the PSAP and/or to a subset of emergency contacts, notifying a subset of emergency contacts of the incident, and/or conferencing an emergency contact into the call.

The call analyzer device continues monitoring the call content to determine satisfied ones of the contextual trigger conditions defined by the user profile (at block 124). When the call analyzer device 20 does not identify any satisfied ones of the contextual trigger conditions (e.g., through an entirety of the call or until the call taker 18 has dispatched first responders), the call analyzer device 20 ends of the method 100 (at block 116).

When, at block 124, the call analyzer device 20 determines satisfied ones of the contextual trigger conditions, the call analyzer device 20 releases, to the PSAP 12, respective subsets of the user data that are associated with respectively satisfied ones of the contextual trigger conditions (at block 128). The call analyzer device prevents the release of subsets of user data that are associated with unsatisfied ones of the contextual trigger conditions. In other words, for each respective satisfied trigger condition, the call analyzer device 20 releases a first respective subset of the user data that is associated with the respective satisfied trigger condition, and prevents release of a second subset of user data that is associated with one or more unsatisfied contextual trigger conditions.

The call analyzer device 20 may release user data contextually-related to the incident to the PSAP 12 by, for example, causing the contextually-related user data to be displayed on a user interface of the call-taking terminal 16, by causing the contextually-related user data to be automatically entered into a CAD dispatch record, or otherwise providing the contextually-related user data to first responders.

Additionally, when the call analyzer device 20 determines that one or more contextual trigger conditions associated with notifying a subset of emergency contacts of the caller 24 are satisfied (at block 132), the call analyzer device selectively notifies the subset of emergency contacts by, for example, providing the respective contact information of the subset of emergency contacts to the PSAP 12 (e.g., a user interface of the PSAP 12) (at block 136).

Figure 5:
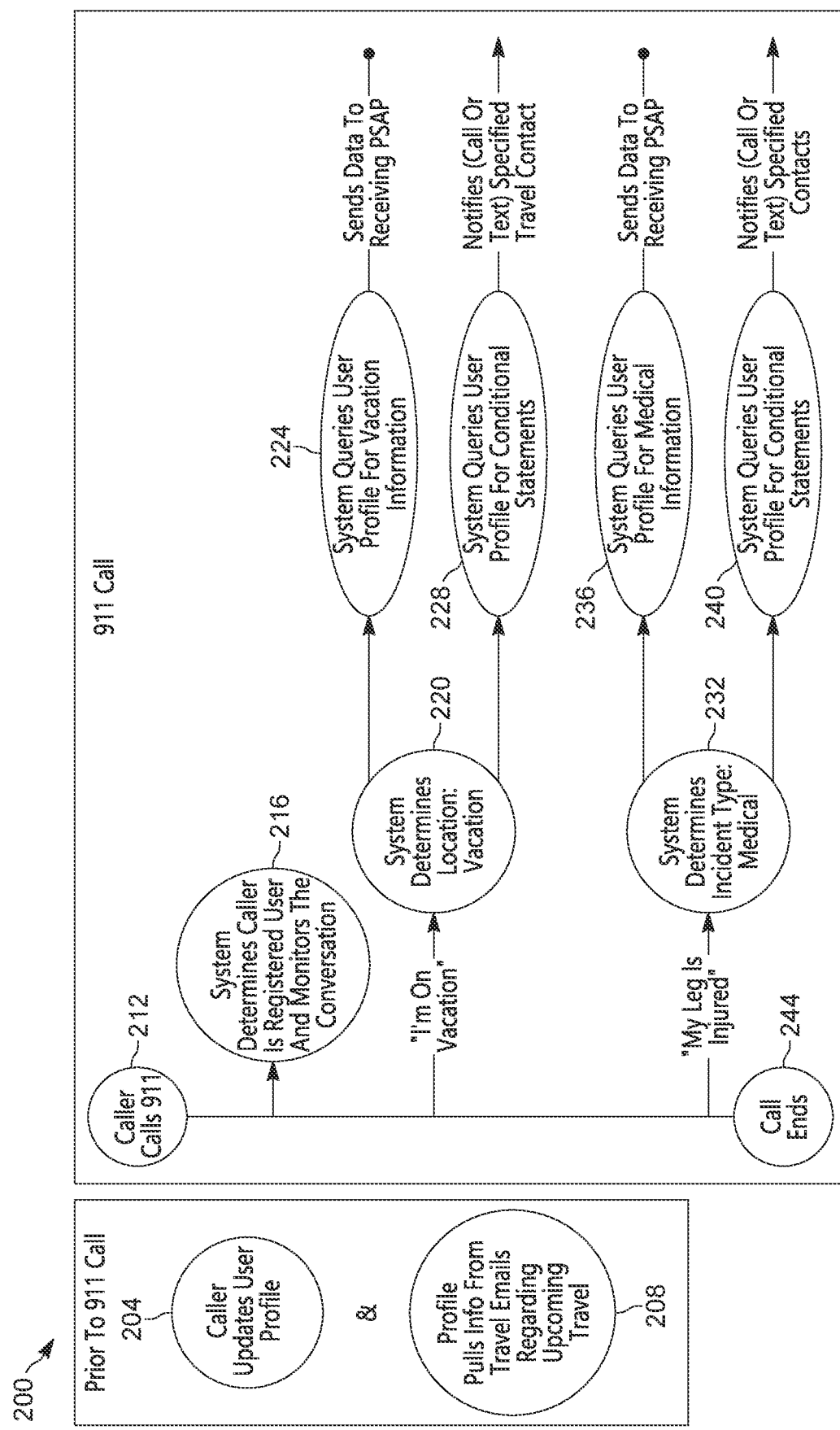
FIG. 5 illustrates a second method for conditional alerting in an emergency call, according to some examples.

FIG. 5 illustrates an example method 200 implemented by, for example, the call analyzer device 20 (e.g., the electronic processor 32) according to an example emergency call. The method 200 includes, before the caller 24 calls 911, receiving user data from the caller during a user profile configuration procedure, the user data being stored as part of a user profile in the database 28 (at block 204). The method 200 also includes receiving a travel itinerary or other information regarding upcoming travel (e.g., travel emails) of the caller 24, and storing the travel information in the user profile associated with the caller 24 (at block 208).

When the caller 24 calls 911 (at block 212), the call analyzer device 20 determines that the caller 24 is registered in the database 28, and monitors the call content between the caller 24 and the call taker 18 (at block 216). In response to the caller 24 stating in the call, "I'm on vacation," the call analyzer device 20 determines that a location of the caller 24 is a location associated with a vacation of the caller 24 (at block 220). The call analyzer device 20 queries the user profile associated with the caller 24 for vacation information, and transmits the corresponding contextually-related travel information (e.g., travel dates, travel location, and/or the like) to the PSAP 12 receiving the call (at block 224).

The call analyzer device 20 also queries the user profile for other conditional actions associated with a satisfied contextual trigger condition that the user is on vacation, and performs the corresponding action (e.g., notifying travel companions or other user-specified travel contacts) (at block 228).

In response to the caller 24 stating, "My leg is injured," the call analyzer device 20 determines that an incident type of the incident is medical (at block 232). The call analyzer device 20 queries the user profile for medical information, and transmits the medical information to the PSAP 12 (at block 236). The call analyzer device 20 also queries the user profile for other conditional actions associated with a satisfied contextual trigger condition that the incident is medical, and performs the corresponding actions (e.g., notifying user-specified contacts) (at block 240).

The call analyzer device 20 continues monitoring the call content until, for example, termination of the call (at block 244).

Figure 6:
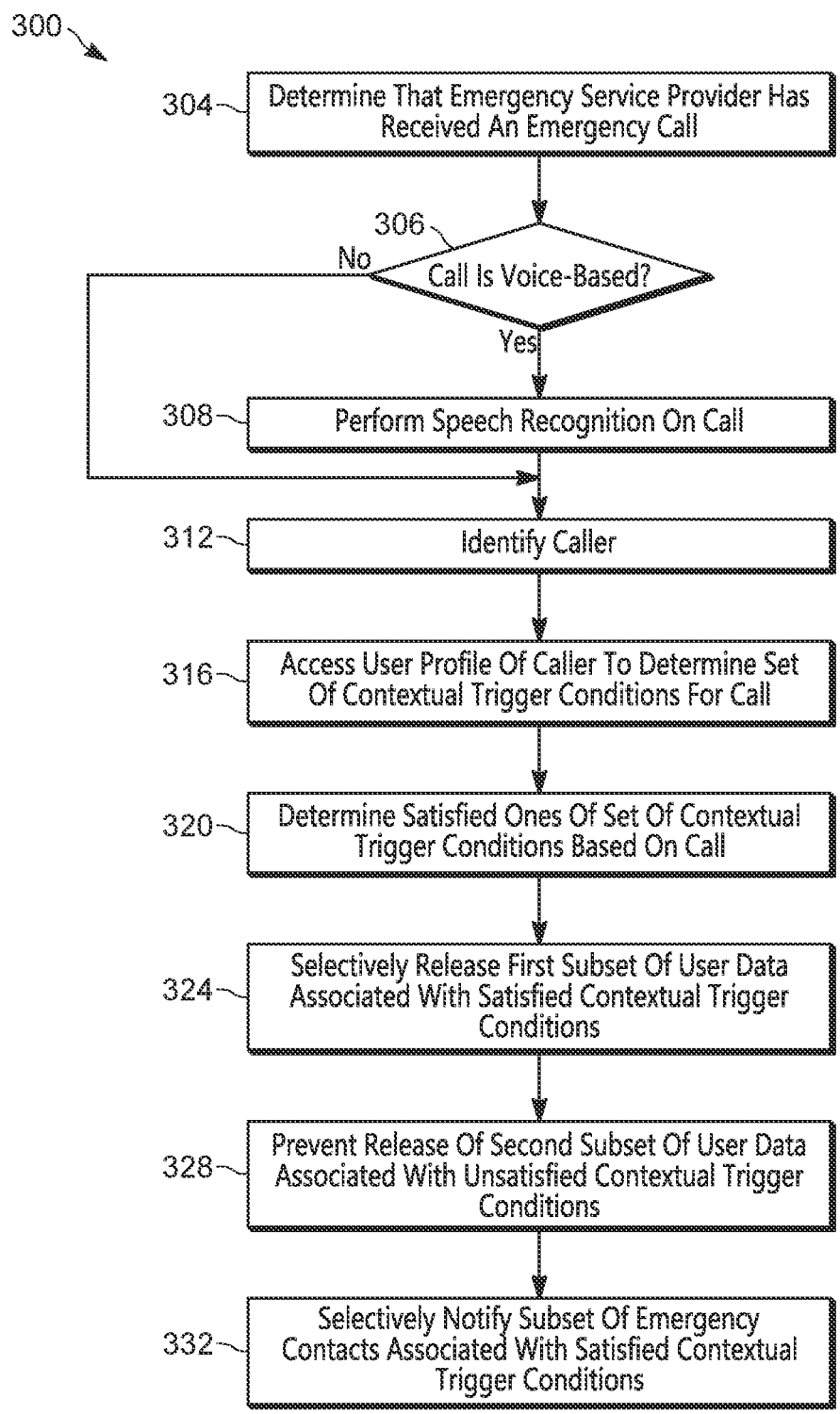
FIG. 6 illustrates a third method for conditional alerting in an emergency call, according to some examples.

FIG. 6 illustrates a third example method 300 implemented by, for example, the call analyzer device 20 (e.g., the electronic processor 32) in response to the PSAP 12 receiving a call from the caller 24. The call analyzer device 20 determines that an emergency service provider (e.g., the PSAP 12) has received a call from the caller 24 regarding an incident (at block 304). In some instances, the call analyzer device 20 determines whether the received call is a text-based call or a voice-based call (at block 306), and, when the call is a voice-based call, performs speech recognition on the voice based call (at block 308). The call analyzer device 20 analyzes the call using, for example, a natural language model.

The call analyzer device 20 identifies the caller 24 based on the received call (at block 312) and accesses, from the database 28, the user profile associated with the caller 24, for example in response to determining that the database 28 includes a user profile associated with the caller 24 (at block 316). Based on the received call, the call analyzer device 20 determines satisfied ones of a set of contextual trigger conditions included in the user profile of the caller 24 and defining types and/or locations of incidents (at block 320).

The call analyzer device 20 selectively releases, to the PSAP 12, a first subset of user data that is associated with one or more satisfied contextual trigger conditions (at block 324) and prevents release of a second subset of user data that is associated with one or more unsatisfied contextual trigger conditions (at block 328). The call analyzer device 20 also selectively notifies a subset of emergency contacts included in the user profile of the incident based on the satisfied ones of the set of contextual trigger conditions (at block 332).

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various examples may be written in an object oriented programming language such as Java, Smalltalk, C++, Python, or the like. However, the computer program code for carrying out operations of various examples may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An emergency call center server comprising:
   an electronic processor;
   a non-transitory computer-readable medium storing program instructions that, when executed by the electronic processor, cause the emergency call center server to perform a set of operations comprising:
   determining that an emergency service provider has received a call from a caller regarding an incident;
   determining whether the received call is a voice-based or a text-based call;
   when the received call is a voice-based call, perform speech recognition on the received call;
   identifying the caller based on a talking content of the received call;
   accessing, from a user profile database storing a plurality of user profiles each associated with respective users, a user profile associated with the caller, the user profile including a set of user data associated with the caller and a set of contextual trigger conditions defining types and/or locations of incidents;
   based on the content of the received call, determining satisfied ones of the set of contextual trigger conditions;
   selectively releasing, to the emergency service provider, a first subset of user data that is associated with one or more satisfied contextual trigger conditions; and
   preventing release of a second subset of user data that is associated with one or more unsatisfied contextual trigger conditions.

2. The server of claim 1, wherein the user profile further includes a set of user-defined emergency contacts, each emergency contact associated with one or more contextual trigger conditions, and the set of operations further comprise:
   selectively notifying a subset of emergency contacts of the incident based on the satisfied ones of the set of contextual trigger conditions.

3. The server of claim 2, wherein the user data includes a set of travel plans defining a travel destination, a location of the incident is associated with the travel destination, and the subset of emergency contacts includes one or more travel companions of the caller.

4. The server of claim 2, wherein the user data includes a set of travel plans defining a travel time period, a time of the incident is within the travel time period, and the subset of emergency contacts includes one or more travel companions of the caller.

5. The server of claim 2, wherein the set of emergency contacts includes at least one selected form the group consisting of a primary care provider of the caller, a building receptionist of a residence of the caller, a building receptionist of a workplace of the caller, a family member of the caller, and a friend of the caller.

6. The server of claim 2, wherein the set of contextual trigger conditions include verbal consent of the caller, and the electronic processor is further configured to selectively notify the subset of emergency contacts of the incident in response to determining, based on the received call, that the caller has given verbal consent for the subset of emergency contacts to be notified of the incident.

7. The server of claim 2, wherein the set of operations further comprise conferencing an emergency contact included in the subset of emergency contacts into the call.

8. The server of claim 1, wherein types of incidents defined by the set of contextual trigger conditions include at least one selected from the group consisting of all emergency incidents, a health-related incident, an injury, an allergic reaction, a mental health crisis.

9. The server of claim 1, wherein locations of incidents defined by the set of contextual trigger conditions include at least one selected from the group consisting of a workplace of the caller, a residence of the caller, a frequented location of the caller predefined by the user profile associated with the caller, and a travel destination of the caller.

10. The server of claim 1, wherein the set of user data includes at least one selected from the group consisting of information about allergies, information about medical conditions, information about medications, information about blood sugar levels, home address, a building access code, information about living arrangements of the caller, and information about dependents of the caller.

11. The server of claim 1, wherein the set of operations further comprise:
for each respective satisfied trigger condition, releasing a first respective subset of the user data that is associated with the respective satisfied trigger condition; and
preventing release of a second respective subset of user data that is associated with unsatisfied ones of the set of contextual trigger conditions.

12. The server of claim 1, wherein accessing the user profile associated with the caller is performed in response to determining that the user profile database includes a user profile associated with the caller.

13. The server of claim 1, wherein the set of operations further comprise:
determining, based on the received call, whether the incident involves the caller or a third party; and
accessing the user profile associated with the caller in response to determining that the incident involves the caller.

14. The server of claim 1, wherein the set of contextual trigger conditions are user-defined by the caller during a configuration procedure of the user profile associated with the caller.

15. The server of claim 1, wherein selectively releasing the first subset of user data that is associated with one or more satisfied contextual trigger conditions causes the first subset of user data to be displayed on a user interface of the emergency service provider.

16. The server of claim 1, wherein the determining satisfied ones of the set of contextual trigger conditions is performed using a natural language model.

17. A method for an emergency call center server, the method comprising:
determining that an emergency service provider has received a call from a caller regarding an incident;
determining whether the received call is a voice-based or a text-based call;
when the received call is a voice-based call, performing speech recognition on the received call;
identifying the caller based on a talking content of the received call;
accessing, from a user profile database storing a plurality of user profiles each associated with respective users, a user profile associated with the caller, the user profile including a set of user data associated with the caller and a set of contextual trigger conditions defining types and/or locations of incidents;
based on the content of the received call, determining satisfied ones of the set of contextual trigger conditions;
selectively releasing, to the emergency service provider, a first subset of user data that is associated with one or more satisfied contextual trigger conditions, and
preventing release of a second subset of user data that is associated with one or more unsatisfied contextual trigger conditions.

18. The method of claim 17, wherein the user profile further includes a set of user-defined emergency contacts, each emergency contact associated with one or more contextual trigger conditions, and the method further comprises:
selectively notifying a subset of emergency contacts of the incident based on the satisfied ones of the set of contextual trigger conditions.

19. The method of claim 18, wherein the user data includes a set of travel plans defining a travel destination, a location of the incident is associated with the travel destination, and the subset of emergency contacts includes one or more travel companions of the caller.

20. The method of claim 19, wherein the user data includes a set of travel plans defining a travel time period, a time of the incident is within the travel time period, and the subset of emergency contacts includes one or more travel companions of the caller.

* * * * *